United States Patent
Ahn et al.

(10) Patent No.: US 9,958,986 B2
(45) Date of Patent: May 1, 2018

(54) TOUCH SENSING APPARATUS

(71) Applicant: SILICON WORKS CO., LTD., Daejeon-si (KR)

(72) Inventors: Yong-Sung Ahn, Ansan-si (KR); Hee-Sop Song, Seongnam-si (KR); Yong-Suk Kim, Daegu-si (KR); Hyung-Seog Oh, Daejeon-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 0 days. days.

(21) Appl. No.: 15/279,791

(22) Filed: Sep. 29, 2016

(65) Prior Publication Data

US 2017/0017348 A1    Jan. 19, 2017

Related U.S. Application Data

(63) Continuation-in-part of application No. 14/369,225, filed as application No. PCT/KR2012/011697 on Dec. 28, 2012.

(30) Foreign Application Priority Data

Dec. 28, 2011   (KR) .................... 10-2011-0144722

(51) Int. Cl.
    G06F 3/045    (2006.01)
    G06F 3/041    (2006.01)
    G06F 3/044    (2006.01)

(52) U.S. Cl.
    CPC ............ *G06F 3/0418* (2013.01); *G06F 3/044* (2013.01)

(58) Field of Classification Search
    CPC ....... G06F 3/0412; G06F 3/044; G06F 3/0416
    USPC ......................................................... 345/174
    See application file for complete search history.

(56) References Cited

U.S. PATENT DOCUMENTS

| | | | |
|---|---|---|---|
| 2010/0300773 A1* | 12/2010 | Cordeiro ................. | G06F 3/044 178/18.06 |
| 2011/0084857 A1* | 4/2011 | Marino ................... | G06F 3/044 341/5 |
| 2011/0170628 A1* | 7/2011 | Oishi ...................... | H04L 27/04 375/295 |
| 2012/0161846 A1* | 6/2012 | Ningrat ................... | G06F 3/044 327/365 |
| 2013/0176269 A1* | 7/2013 | Sobel ..................... | G06F 3/0416 345/174 |

(Continued)

*Primary Examiner* — Yuzhen Shen

(74) *Attorney, Agent, or Firm* — Kile Park Reed & Houtteman PLLC

(57) ABSTRACT

The present invention introduces a touch sensing apparatus capable of adjusting an Rx frequency band, and the touch sensing apparatus can adjust the width of the Rx frequency band of a driving signal which is applied from a driving electrode of a touch screen panel and transferred to a receiving electrode of the touch screen panel, using a high pass filter and a low pass filter which are implemented with a differentiator and an integrator, respectively. The touch sensing apparatus can adjusting the resistances of a plurality of resistors and the capacitance of a capacitor, thereby selectively receiving a driving signal at each frequency and amplifying the received driving signal to a predetermined magnitude. Thus, since the touch sensing apparatus does not requires a separate filter for removing noise contained in the driving signal, the system can be simplified.

16 Claims, 6 Drawing Sheets

(56) References Cited

U.S. PATENT DOCUMENTS

2013/0300692 A1\* 11/2013 Jang ................ G06F 3/044
 345/173
2014/0267129 A1\* 9/2014 Rebeschi ............ G06F 3/0418
 345/174

\* cited by examiner

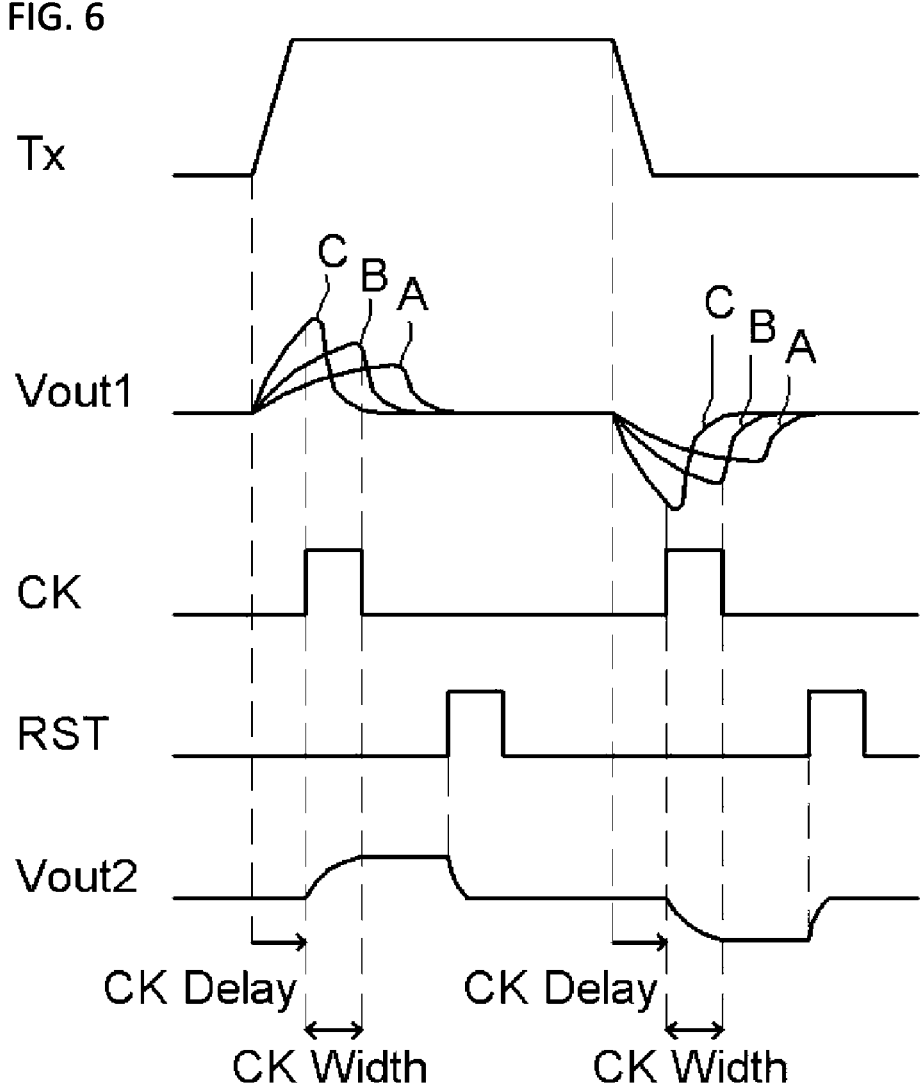

TOUCH SENSING APPARATUS

CROSS REFERENCE TO RELATED APPLICATIONS

This application is a continuation-in-part application of U.S. patent application Ser. No. 14/369,225, filed Jun. 27, 2014 (now pending), the disclosure of which is herein incorporated by reference in its entirety. The U.S. patent application Ser. No. 14/369,225 is a national entry of International Application No. PCT/KR2012/011697, filed on Dec. 28, 2012, which claims priority to Korean Application No. 10-2011-0144722 filed on Dec. 28, 2011, the entire contents of which are incorporated herein by reference.

BACKGROUND

1. Technical Field

The present disclosure relates to a touch sensing apparatus, and more particularly, to a touch sensing apparatus capable of improving the efficiency of a process of determining a touch sensing signal of a touch screen panel.

2. Related Art

A touch screen panel may be configured to sense a touch in a capacitive manner.

The capacitive touch screen panel includes driving electrodes for receiving a driving signal and sensing electrodes for outputting a touch sensing signal, and senses a touch using coupling capacitors formed between the respective driving electrodes and the sensing electrodes.

For example, when the driving electrodes and the sensing electrodes of the touch screen panel are configured to cross each other, the coupling capacitors are formed at the respective nodes where the driving electrodes and the sensing electrodes cross each other. The capacitance of the coupling capacitor is changed when the corresponding node of the touch screen panel is touched.

The driving electrodes receive driving signals with the same magnitude and frequency. When there is no touch on the nodes at which the coupling capacitors are formed, the same touch sensing signals are outputted from the sensing electrodes. When there is a touch on a specific node, the capacitance of the coupling capacitor of the corresponding node is changed, and a touch sensing signal outputted from the sensing electrode of the corresponding node is changed according to the change of the capacitance. A touch sensing apparatus senses the touch of the corresponding node by determining the change of the touch sensing signal.

The touch sensing signal may contain various frequencies of noise while being influenced by noise caused by a parasitic capacitor and parasitic resistor of the touch screen panel. Thus, the touch sensing apparatus must be able to accurately determine the touch sensing signal while distinguishing between the touch sensing signal and noise.

The touch sensing signal is also influenced by a load of the touch screen panel. Although touch sensing signals are generated from the same sensing electrode, the touch sensing signals may have a difference therebetween depending on the touch positions. That is, a touch sensing signal generated through a touch on a node close to an output terminal of a sensing line is different from a touch sensing signal generated through a touch on a node away from the output terminal of the sensing line. Therefore, in order for the touch sensing apparatus to accurately determine a touch sensing signal, the influence of the load on the touch sensing signal must be reduced.

SUMMARY

Various embodiments are directed to a touch sensing apparatus capable of adjusting a receive (Rx) frequency band to accurately determine a touch sensing signal while distinguishing between the touch sensing signal and noise.

Also, various embodiments are directed to a touch sensing apparatus capable of accurately determining a touch sensing signal by reducing the influence of a load on the touch sensing signal.

In an embodiment, a touch sensing apparatus may include: a high pass filter configured to decide a second cut-off frequency by varying the resistance of at least one of a first resistor which transfers a touch sensing signal outputted from a sensing electrode to a first amplifier and is implemented with a variable resistor and a second resistor which forms a first feedback loop for the first amplifier and is implemented with the variable resistor, and output a first output signal obtained by filtering a frequency component equal to or lower than the second cut-off frequency in the touch sensing signal, and a low pass filter comprising a sampling switch which switches transfer of the first output signal, a third resistor which transfers the first output signal having passed through the sampling switch to a second amplifier and is implemented with the variable resistor, and a feedback capacitor which forms a second feedback loop for the second amplifier and is implemented with a variable capacitor, and configured to sample the first output signal during a sampling period, decide a third cut-off frequency by varying at least one of the resistance of the third resistor and the capacitance of the feedback capacitor, and output a second output signal obtained by filtering a frequency component equal to or higher than the third cut-off frequency in the first output signal. The sampling period may be maintained for a second time from a time point delayed by a first time based on a transition time point of a driving signal applied to the driving electrode.

In another embodiment, a touch sensing apparatus may include: a differentiator configured to output a first output signal obtained by differentiating a touch sensing signal outputted from a sensing electrode, using a coupling capacitor between a driving electrode and the sensing electrode of a touch screen pad and a sheet resistor formed by the sensing electrode; and an integrator configured to sample the first output signal during a sampling period, and output a second output signal obtained by integrating the first output signal transferred during the sampling period. The sampling period may be maintained for a second time from a time point delayed by a first time based on a transition time of a driving signal applied to the driving electrode.

BRIEF DESCRIPTION OF THE DRAWINGS

FIG. 6 is a waveform diagram for describing an operation of the touch sensing apparatus according to the embodiment of the present invention, depending on an operation of a sampling switch SW1.

DETAILED DESCRIPTION

Figure 1:
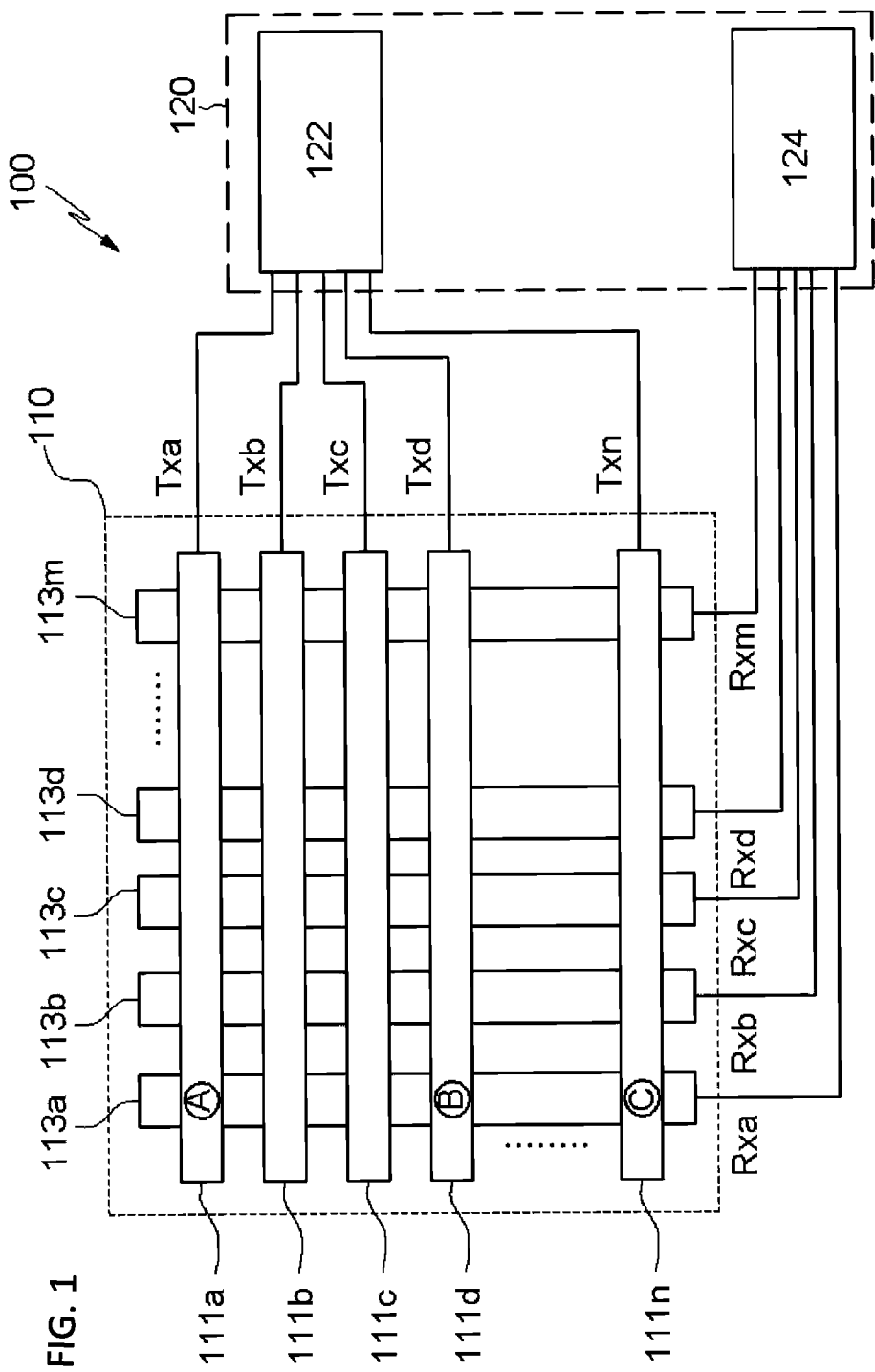
FIG. 1 is a block diagram illustrating a touch sensing apparatus according to an embodiment of the present invention.

In order to promote understanding of the advantages in operation of the present invention and the purpose achieved by exemplary embodiments of the present invention, the accompanying drawings for describing the exemplary embodiments of the present invention and the contents described in the drawings should be referred to.

Hereafter, embodiments of the present invention will be described in detail with reference to the accompanying drawings. In the drawings, like reference numerals denote the same components.

FIG. 1 illustrates a touch sensing apparatus 100 according to an embodiment of the present invention.

The touch sensing apparatus 100 includes a touch screen panel 110 and a driving and sensing module 120. The driving and sensing module 120 includes a driving unit 122 for providing driving signals Txa to Txn and a sensing unit 124 for receiving touch sensing signals Rxa to Rxm. Each of the driving unit 122 and the sensing unit 124 may be prepared in the form of an integrated circuit.

Figure 2:
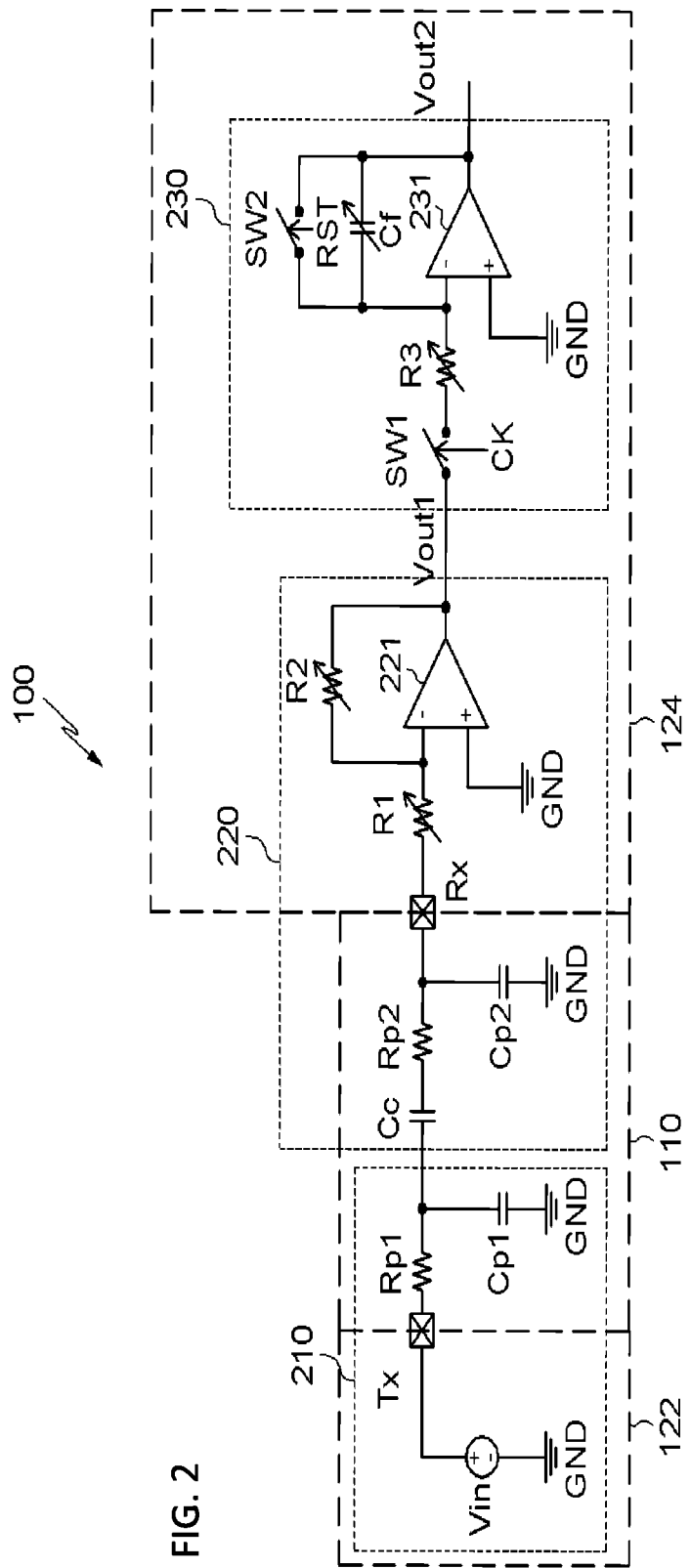
FIG. 2 is a circuit diagram equivalently illustrating the touch sensing apparatus of FIG. 1.

The touch screen panel 110 may include a plurality of driving electrodes 111a to 111n and a plurality of sensing electrodes 113a to 113m, and the driving electrodes 111a to 111n and the sensing electrodes 113a to 113m may be arranged adjacent to each other. For example, the driving electrodes 111a to 111n and the sensing electrodes 113a to 113m may be arranged to cross each other. At each of the nodes between the driving electrodes 111a to 111n and the sensing electrodes 113a to 113m, a coupling capacitor Cc of FIG. 2 is formed. That is, the touch screen panel 110 is configured to sense a touch in a capacitive manner.

The driving unit 122 provides the driving signals Txa to Txn with the same magnitude and frequency to the driving electrodes 111a to 111n, and the sensing unit 124 receives the touch sensing signals Rxa to Rxm outputted from the sensing electrodes 113a to 113n. Hereafter, the driving signals Txa to Txn are collectively referred to as a driving signal Tx, and the touch sensing signals Rxa to Rxm are collectively referred to as a touch sensing signal Rx.

The capacitance of the coupling capacitor Cc is changed when a user touches the corresponding node of the touch screen panel 110. The touch sensing signal Rx is changed according to the change in capacitance of the coupling capacitor Cc. Thus, the touch sensing signal Rx differs depending on whether there is a touch.

The touch sensing signal Rx may not only contain the change in capacitance of the coupling capacitor Cc, but also contain noise caused by a parasitic capacitor and parasitic resistor of the touch screen panel 110.

The touch sensing signal Rx is influenced by a position of the touch screen panel 110, at which a touch occurs, that is, a load. In FIG. 1, a touch sensing signal Rx outputted from the sensing electrode 113a differs depending on touches at positions A, B and C of the sensing electrode 113a. That is, the touch sensing signal Rx has such a waveform that is attenuated as a touch position is away from an output terminal of the sensing electrode 113a. Therefore, in order for the touch sensing apparatus 100 to accurately determine a touch sensing signal Rx, the touch sensing signal Rx needs to be insensitive to the influence of a load depending on a difference in distance to the output terminal of the sensing electrode 113a between touch positions, that is, a difference between touch positions.

FIG. 2 is a circuit diagram equivalently illustrating the touch sensing apparatus 100 of FIG. 1, in order to describe the generation and determination of the touch sensing signal Rx corresponding to the driving signal Tx. As illustrated in FIG. 2, the touch sensing apparatus according to the present embodiment may adjust a receive (Rx) frequency band to accurately determine a touch sensing signal while distinguishing between the touch sensing signal and noise.

The touch sensing apparatus 100 of FIG. 2 is divided into a pre-stage 210, a differentiator 220 and an integrator 230 on a circuit basis. FIG. 2 exemplifies one driving electrode 111a and one sensing electrode 113a. The circuits are formed across the driving unit 122, the touch screen panel 110 and the sensing unit 124. According to the above-described configuration, the touch sensing apparatus 100 may adjust the Rx frequency band of the touch sensing signal Rx and acquire a touch sensing signal from which noise is filtered.

The touch screen panel 110 includes a coupling capacitor Cc formed at the node between the driving electrode 111a and the sensing electrode 113a. The driving electrode 111a serves as an equivalent model of a first sheet resistor Rp1, and the sensing electrode 113a serves as an equivalent model of a second sheet resistor Rp2. A capacitive load component applied to the driving electrode 111a of the touch screen panel 110 serves as an equivalent model of a first sheet capacitor Cp1, and a capacitive load component applied to the sensing electrode 113a serves as an equivalent model of a second sheet capacitor Cp2. The first and second sheet capacitors Cp1 and Cp2 may be understood as parasitic components.

The pre-stage 210 includes the first sheet resistor Rp1 and the first sheet capacitor Cp1 which are operated in the driving electrode 111a to which the driving signal Tx is applied. One end of the first sheet capacitor Cp1 is grounded, and the first sheet resistor Rp1 and the first sheet capacitor Cp1 are connected in parallel to each other. In the pre-stage 210, Vin represents an equivalent model of the driving unit 122 for providing a driving signal Tx. The pre-stage 210 includes the first sheet resistor Rp1 and the first sheet capacitor Cp1 of the touch screen panel 110.

The differentiator 220 includes the coupling capacitor Cc, the second sheet resistor Rp2 and the second sheet capacitor Cp2, which are operated in the sensing electrode 113a that outputs a touch sensing signal Rx. One end of the second sheet capacitor Cp2 is grounded, and the second sheet resistor Rp2 and the second sheet capacitor Cp2 are connected in parallel to each other.

The differentiator 220 further includes a first resistor R1, a second resistor R2 and a first amplifier 221. The first and second resistors R1 and R2 may be embodied by variable resistors. The first resistor R1 transfers a touch sensing signal Rx outputted through the sensing electrode 113a, that is, the second sheet resistor Rp2 to a negative input terminal (−) of the first amplifier 221. The second resistor R2 is disposed between an output terminal and the negative input terminal of the first amplifier 221, while forming a feedback loop. The positive input terminal (+) of the first amplifier is grounded.

The differentiator 220 includes the second sheet resistor Rp2 and the second sheet capacitor Cp2 of the touch screen panel 110 and the first resistor R1, the second resistor R2 and the first amplifier 221 of the sensing unit 124.

As the driving signal Tx of the pre-stage 210 is applied to the coupling capacitor Cc, the differentiator 220 differentiates the touch sensing signal Rx outputted from the sensing electrode 113a, that is, the second sheet resistor Rp2, and outputs the differentiated signal as a first output signal Vout1. The first output signal Vout1 may be understood as the differentiated touch sensing signal Rx.

The integrator 230 integrates the first output signal Vout1 outputted from the differentiator 220, and outputs the integrated signal as a second output signal Vout2. For this operation, the integrator 230 includes a sampling switch SW1, a reset switch SW2, a third resistor R3, a feedback capacitor Cf and a second amplifier 231, which are included in the sensing unit 124. The third resistor R3 may be embodied by a variable resistor, and the feedback capacitor Cf may be embodied by a variable capacitor Cf while forming a feedback loop for the second amplifier 231.

The sampling switch SW1 is switched by the sampling signal CK. When the sampling switch SW1 is turned on, the sampling switch SW1 transfers the first output signal Vout1 of the differentiator 220 to the third resistor R3.

The third resistor R3 is positioned between the sampling switch SW1 and the negative input terminal (−) of the second amplifier 231. The feedback capacitor Cf is positioned between an output terminal and the negative input terminal of the second amplifier 231, while forming a feedback loop. The positive input terminal (+) of the second amplifier 231 is grounded.

The reset switch SW2 is switched by a reset signal RST, and connected in parallel to the feedback capacitor Cf. When the reset switch SW2 is turned off, the reset switch SW2 guarantees charging of the feedback capacitor Cf, and when the reset switch SW2 is tuned on, the reset switch SW2 resets the charge stored in the feedback capacitor Cf.

The integrator 230 integrates the first output signal Vout1 outputted from the differentiator 220 and outputs the integrated signal as the second output signal Vout2, in response to the state in which the sampling switch SW1 is turned on and the reset switch SW2 is turned off. Furthermore, when the reset switch SW2 is turned on, the integrator 230 initializes the second output signal Vout2 by resetting the charge stored in the feedback capacitor Cf. The second output signal Vout2 may be understood as a touch sensing signal Rx obtained by integrating the differentiated touch sensing signal Rx through the integrator 230.

According to the above-described configuration, the driving unit 122 periodically provides the driving signal Tx.

The sensing unit 124 periodically receives the touch sensing signal Rx in response to the periodically provided driving signal Tx. That is, the differentiator 220 differentiates the touch sensing signal Rx which is periodically generated, and provides the differentiated signal as the first output signal Vout. The differentiator 220 provides the first output signal Vout1 including a positive differentiated signal formed at a rising edge of the driving signal Tx and a negative differentiated signal formed at a falling edge of the driving signal Tx. The existence of the positive differentiated signal and the negative differentiated signal in the first output signal Vout1 is based on the characteristic of a differentiating operation of the differentiator 220 which senses the direction of change in a signal.

The integrator 230 samples the positive differentiated signal of the first output signal Vout, and samples the negative differentiated signal of the first output signal Vout. Here, the sampling indicates integration, and is performed in response to a turn-on of the sampling switch SW1. That is, the integrator 230 provides the second output signal Vout2 which is reset after the positive differentiated signal is sampled, and reset after the negative differentiated signal is sampled, in response to a one-cycle driving signal Tx.

Figure 3:
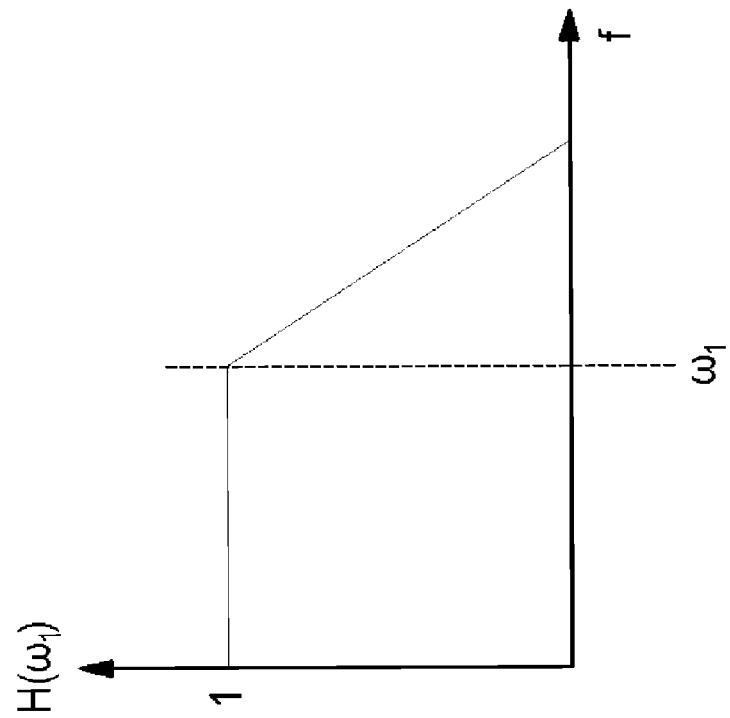
FIG. 3 illustrates a pre-stage of FIG. 2 and a transfer characteristic graph thereof.
Figure 3:
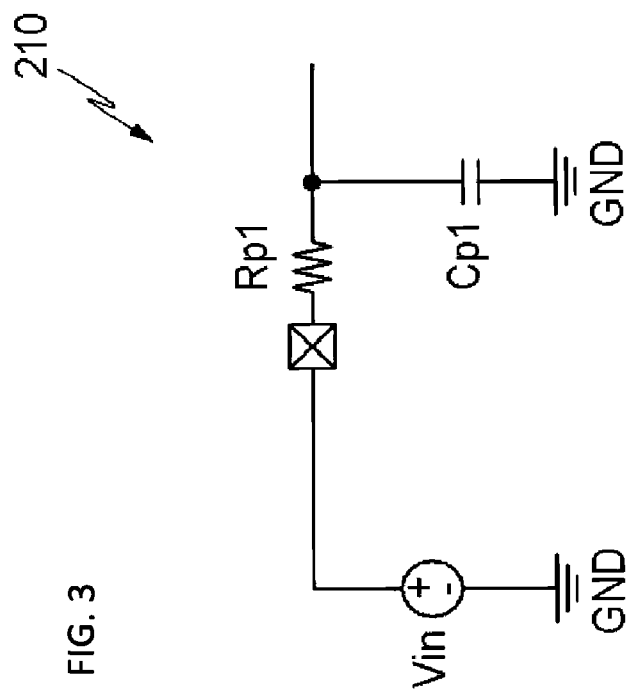
Figure 4:
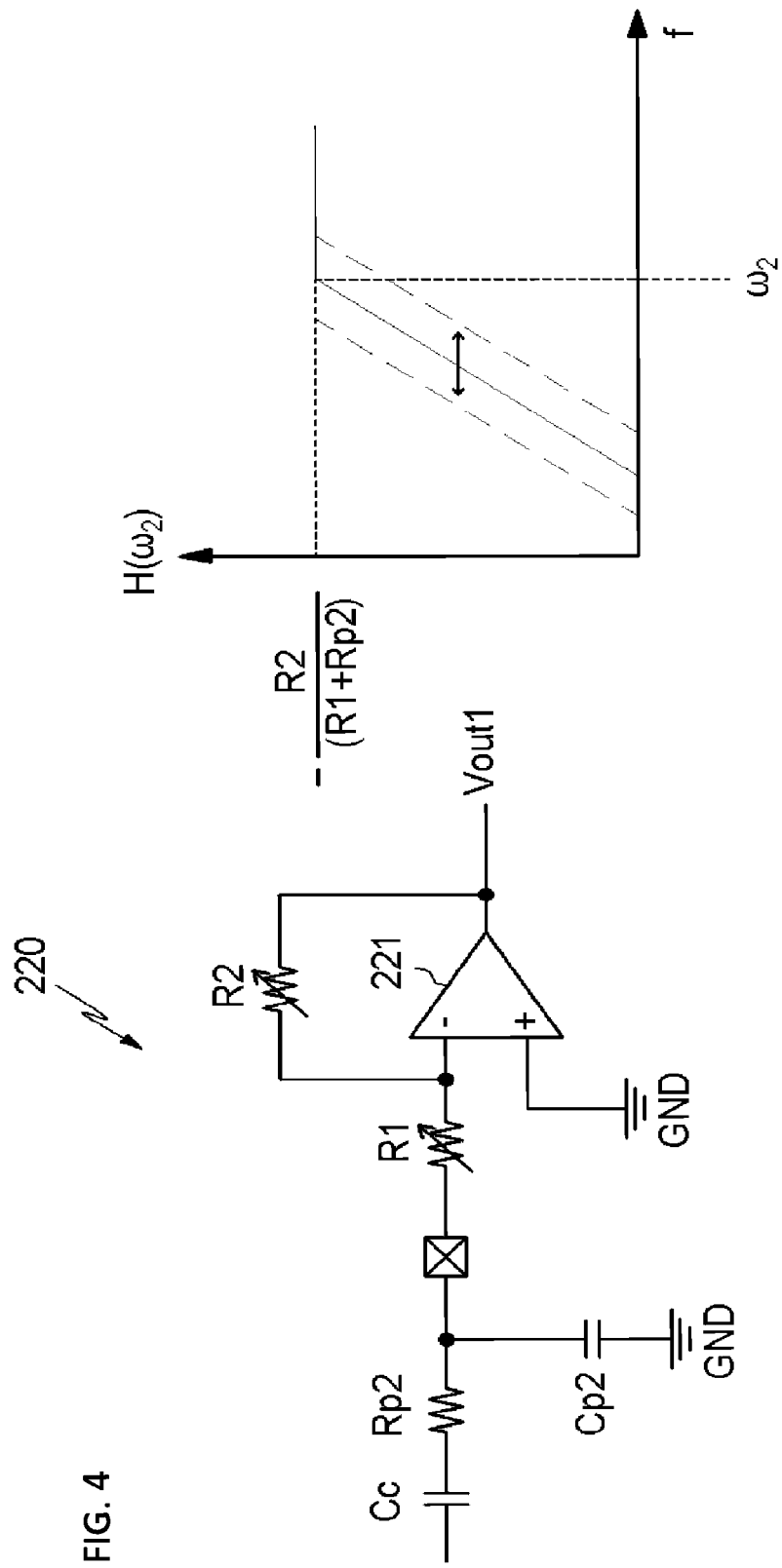
FIG. 4 illustrates a differentiator of FIG. 2 and a transfer characteristic graph thereof.
Figure 5:
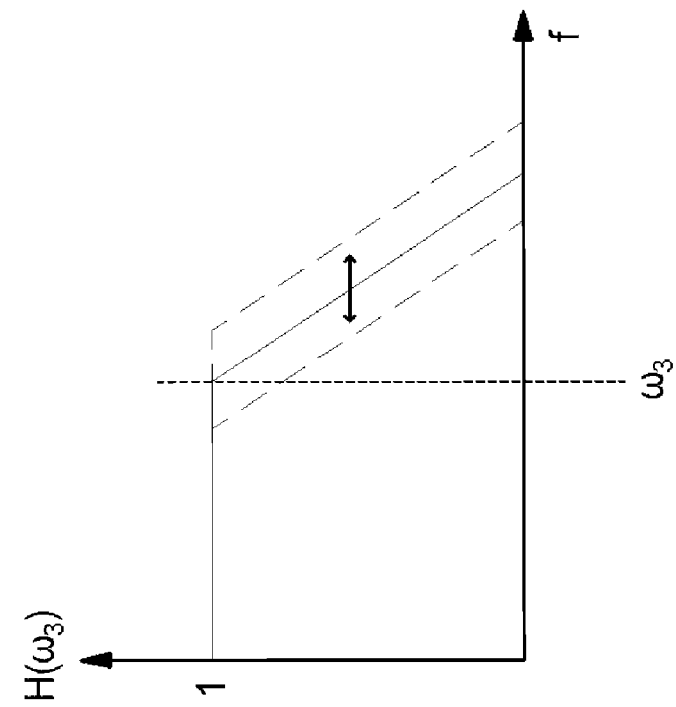
FIG. 5 illustrates an integrator of FIG. 2 and a transfer characteristic graph thereof.
Figure 5:
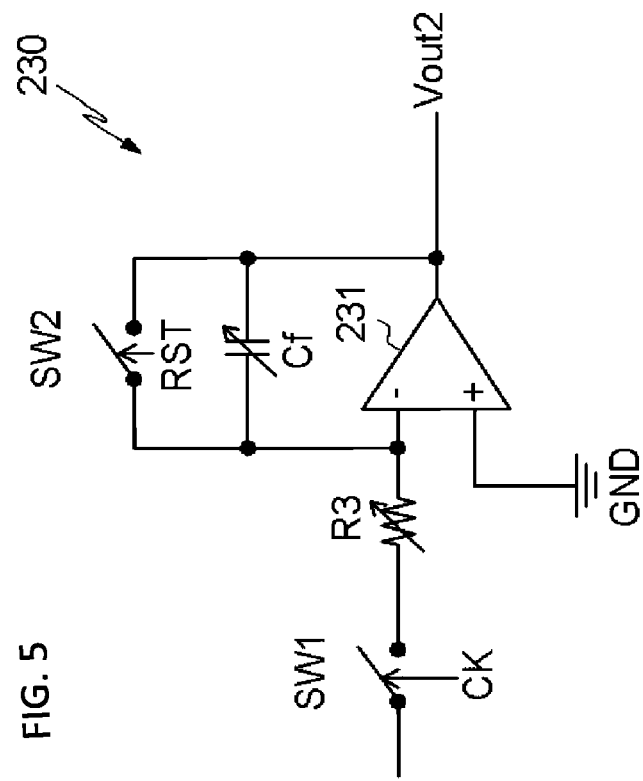

The operation of the touch sensing apparatus according to the embodiment of FIGS. 1 and 2 has been described on a time basis. Thus, the terms such as differentiator and integrator have been used. On the other hand, the operation of the touch sensing apparatus according to the embodiment of FIGS. 1 and 2 may be described on a frequency basis. Referring to FIGS. 3 to 5, the operations of the pre-stage 210, the differentiator 220 and the integrator 230 in FIGS. 1 and 2 will be described on a basis of operation frequency.

FIG. 3 illustrates the pre-stage 210 of FIG. 2 and a transfer characteristic graph of the pre-stage 210. The pre-stage 210 has a low pass characteristic, and is embodied by a gain circuit including the first resistor R1, the second resistor R2 and the first amplifier 221. Here, the gain may indicate the ratio of the first resistor R1 to the second resistor R2, and the values of the first and second resistors R1 and R2 embodied by variable resistors may be adjusted to control the gain.

The pre-stage 210 of FIG. 3 has an operation characteristic of a low pass filter as indicated by the transfer characteristic graph. The pre-stage 210 has a transfer function $H(\omega_1)$ expressed as Equation 1 below.

$$H(\omega_1) = \frac{1}{1 + Rp1 \cdot j\omega_1 Cp1} \quad \text{[Equation 1]}$$

In Equation 1, Rp1 denotes the resistance of the first sheet resistor, Cp1 denotes the capacitance of the first sheet capacitor, and $\omega_1$ denotes a first cut-off frequency of the low pass filter.

The pre-stage 210 removes a frequency component higher than the first cut-off frequency $\omega_1$ and passes only a frequency component lower than the first cut-off frequency $\omega_1$, among frequency components included in the pulse-type driving signal Tx.

FIG. 4 illustrates the differentiator 220 and a transfer characteristic graph of the differentiator 220. The differentiator 220 has a high pass characteristic.

The differentiator 220 of FIG. 4 has an operation characteristic of a high pass filter as indicated by the transfer characteristic graph. The differentiator 220 has a transfer function $H(\omega_2)$ expressed as Equation 2 below.

$$H(\omega_2) = -\frac{R2}{R1 + Rp2 + \frac{1}{j\omega_2 Cc}} = -\frac{j\omega_2 Cc \cdot R2}{1 + j\omega_2 Cc(R1 + Rp2)} \quad \text{[Equation 2]}$$

In Equation 2, R1 denotes the resistance of the first resistor, R2 denotes the resistance of the second resistor value, Rp2 denotes the resistance of the second sheet resistor, and Cc denotes the capacitance of the coupling capacitor.

The differentiator 220 passes a frequency component which is lower than the first cut-off frequency $\omega_1$ of the pre-stage 210 and higher than a second cut-off frequency $\omega_2$, among the frequency components included in the touch sensing signal Rx. That is, the differentiator 220 has the operation characteristic of the high pass filter which removes a frequency component lower than the second cut-off frequency $\omega_2$. When the values of the first and second resistors R1 and R2 in the differentiator 220 are changed, the second cut-off frequency $\omega_2$ may be changed as indicated by an arrow illustrated in the transfer characteristic graph of FIG. 4. That is, the differentiator 220 may filter noise from the touch sensing signal Rx, the noise being distributed in frequency components equal to or less than a desired level.

The differentiator 220 amplifies the touch sensing signal Rx by a gain of Equation 3 which can be expressed by the resistances of the first resistor R1, the second resistor R2 and the second sheet resistor Rp2. In Equation 3, a minus symbol (−) represents that the first amplifier 221 is used in the form of a negative feedback.

$$\text{Gain} = -\frac{R2}{R1 + Rp2} \qquad \text{[Equation 3]}$$

FIG. 5 illustrates the integrator 230 and a transfer characteristic graph of the integrator 230.

The integrator 230 of FIG. 5 has an operation characteristic of a low pass filter as indicated by the transfer characteristic graph. The integrator 230 has a transfer function $H(\omega_3)$ expressed as Equation 4 below.

$$H(\omega_3) = -\frac{1}{R3 \cdot j\omega_3 Cf} \qquad \text{[Equation 4]}$$

In Equation 4, R3 denotes the resistance of the third resistor, Cf denotes the capacitance of the feedback capacitor, and $\omega_3$ denotes the third cut-off frequency of the low pass filter.

The integrator 230 removes a frequency component higher than the third cut-off frequency $\omega_3$ among the frequency components included in the touch sensing signal Rx having passed through the differentiator 220 serving as a high pass filter. More specifically, the second amplifier 231 of the integrator 230 charges the feedback capacitor Cf by integrating the first output signal Vout1 transferred through the third resistor R3 in response to a turn-on of the sampling switch SW1 during a sampling period, and outputs the second output signal Vout2 obtained by filtering frequency components equal to or higher than the third cut-off frequency $\omega_3$. The second integrator 231 of the integrator 230 outputs the reset second output signal Vout2 as the feedback capacitor Cf is discharged in response to a turn-on of the reset switch SW2 after the sampling period.

The transfer function $H(\omega)$ of the touch sensing apparatus 100 including the pre-stage 210, the differentiator 220 and the integrator 230 of FIGS. 3 to 5 may be expressed as Equation 5.

When the integrator 230 changes the value of the third resistor R3 and the capacitance of the feedback capacitor Cf, the third cut-off frequency $\omega_3$ may be changed as indicated by an arrow illustrated in the transfer characteristic graph of FIG. 5. That is, the integrator 230 may filter noise from the touch sensing signal Rx, the noise being distributed in frequency components equal to or less than a desired level.

$$H(\omega) = \left(\frac{1}{1 + Rp1 \cdot j\omega Cp1}\right) \cdot \left(-\frac{j\omega_2 Cc \cdot R2}{1 + j\omega Cc(R1 + Rp2)}\right) \cdot \left(-\frac{1}{R3 \cdot j\omega Cf}\right) \qquad \text{[Equation 5]}$$

In Equation 5, the resistance of the first sheet resistor Rp1 and the capacitance of the first sheet capacitor Cp1 may be defined as constants which are considerably small. Referring to Equations 1 and 5, the resistance of the first sheet resistor Rp1 and the capacitance of the first sheet capacitor Cp1 are considerably low. Thus, the first cut-off frequency $\omega_1$ has a considerably high value. In reality, the first cut-off frequency $\omega_1$ is considerably higher than the third cut-off frequency $\omega_3$. Therefore, the characteristic of the low pass filter of the pre-stage 210 may be omitted in the following descriptions.

Referring to Equation 5, the relation between the driving signal Tx of the pre-stage 210 and the output signal Vout2 of the integrator 230 may be expressed as Equation 6 below. In Equations 6 and 7, the driving signal Tx is denoted by 'Vin'.

$$Vout = -\frac{R2 \cdot Cc}{R1 + Rp2} \times \frac{dVin}{dt} \times \frac{1}{Cf \cdot R3} \times \int Vindt \qquad \text{[Equation 6]}$$

Equation 6 may be simply summarized as expressed by Equation 7 below.

$$Vout = \frac{R2}{(R1 + Rp2) \cdot R3} \times \frac{Cc}{Cf} \times Vin \qquad \text{[Equation 7]}$$

Referring to FIG. 7, the resistance of the second sheet resistance Rp2 is lower than the resistances of the other three resistors R1, R2 and R3, and defined as a constant value which is decided by the material of the sensing electrode 113a, and the capacitance of the coupling capacitor Cc is also defined as a constant value which is decided by the material of the touch screen panel 110. On the other hand, since the first to third resistors R1 to R3 and the feedback capacitor Cf are embodied by variable resistors and a variable capacitor, the values of the first to third resistors R1 to R3 and the feedback capacitor Cf may be adjusted.

Equation 5 expresses the transfer function of the touch sensing apparatus 100 according to the present embodiment in the frequency domain, and Equation 7 expresses the transfer function of the touch sensing apparatus 100 according to the present embodiment in the time domain. Referring to Equations 5 and 7, the touch sensing apparatus 100 according to the present embodiment may adjust the gain and filtering frequency of the touch sensing signal Rx by varying the resistances of the first to third resistors R1 to R3 and the capacitance of the feedback capacitor Cf.

The touch sensing apparatus according to the embodiment of FIGS. 1 and 2 have an operation characteristic of a band-pass filter through a combination of the differentiator 220 and the integrator 230. For this configuration, the touch sensing apparatus needs to set the resistances of the first to third resistors R1 to R3 and the capacitance of the feedback capacitor Cf such that the second cut-off frequency $\omega_2$ is lower than the first cut-off frequency $\omega_1$ and the third cut-off frequency $\omega_3$. That is, the touch sensing signal Rx is filtered by the touch sensing apparatus 100 according to the present embodiment, and thus has a frequency component higher than the second cut-off frequency $\omega_2$ and lower than the first and third cut-off frequencies $\omega_1$ and $\omega_3$.

The touch sensing apparatus according to the present embodiment described with reference to FIGS. 1 to 5 may adjust the Rx frequency band of the touch sensing signal Rx by changing the resistances of the first to third resistors R1 to R3 and the capacitance of the feedback capacitor Cf, and accurately determine the touch sensing signal Rx while distinguishing between the touch sensing signal Rx and noise.

Furthermore, the touch sensing apparatus according to the present embodiment may adjust the turn-on time of the sampling switch SW1 as illustrated in FIG. 6, in order to accurately determine the touch sensing signal Rx while reducing the influence of a load on the touch sensing signal Rx. The period during which a turn-on of the sampling switch SW1 is maintained after the sampling switch SW1 is turned on may be defined as the sampling period, and the sampling period may be decided in consideration of a load having an influence on the touch sensing signal Rx. The sampling period may be set to be maintained for a preset time CK Width from a time point delayed by a preset time CK Delay based on a transition time point of the driving signal Tx applied to the driving electrode 111a. For this setting, the sampling signal CK for controlling the switching operation of the sampling switch SW1 transitions to a high level at the time point delayed by the preset time CK Delay based on the transition time point of the driving signal Tx, and retains a high level for the preset time CK Width.

The touch sensing signal Rx may have a different waveform due to the influence of a load depending on a difference in distance to the output terminal of the sensing electrode 113a between touch positions, that is, a difference between the positions of touched nodes.

In the first output signal Vout1 of FIG. 6, a waveform A indicates the first output signal Vout1 of the differentiator 220 for the touch sensing signal Rx corresponding to the position A of FIG. 1, a waveform B indicates the first output signal Vout1 of the differentiator 220 for the touch sensing signal Rx corresponding to the position B of FIG. 1, and a waveform C indicates the first output signal Vout1 of the differentiator 220 for the touch sensing signal Rx corresponding to the position C of FIG. 1.

Referring to FIG. 1, the position A is the most remote from the output terminal of the sensing electrode 113a, and the position C is the closest to the output terminal of the sensing electrode 113a. That is, the resistance of the second sheet resistor Rp2 and the capacitance of the second sheet capacitor Cp2 which are applied to the touch sensing signal Rx corresponding to a touch on the position A are the largest, and the resistance of the second sheet resistor Rp2 and the capacitance of the second sheet capacitor Cp2 which are applied to the touch sensing signal Rx corresponding to a touch on the position C are the smallest. Thus, since the touch sensing signal Rx corresponding to the touch on the position A is influenced by the largest load, the waveform of the touch sensing signal Rx is most attenuated. Furthermore, since the touch sensing signal Rx corresponding to the touch on the position C is influenced by the smallest load, the waveform of the touch sensing signal Rx is least attenuated.

Therefore, as illustrated in FIG. 6, the first output signal Vout1 obtained by differentiating the touch sensing signal Rx is significantly attenuated by the influence of a load, as a touch position is away from the output terminal of the sensing electrode 113a.

The first output signal Vout is sampled by the integrator 230.

The integrator 230 starts sampling the first output signal Vout1 according to the sampling signal CK which transitions to a high level at a time point delayed by the preset time CK Delay based on the transition time of the driving signal Tx, and samples the first output signal Vout1 for the preset time CK Delay.

The feedback capacitor Cf is charged with the integrated voltage of the first output signal Vout1 which is transferred through the third resistor R3 in response to a turn-on of the sampling switch SW1 during the sampling period, and the amplifier 231 outputs the second output signal Vout2 corresponding to the voltage stored in the feedback capacitor Cf until the feedback capacitor Cf is reset by the reset switch SW2. The second output signal Vout2 may be reset by the reset switch SW2 before the next sampling period.

The integrator 230 receives the first output signal Vout1 having a difference depending on the position of a touched node. When the sampling switch SW1 is controlled to be turned on for a predetermined time from the same time point as a rising edge of the driving signal Tx, the integrator 230 outputs the second output signal Vout having a difference depending on the position of a touched node.

In the present embodiment, however, the sampling period may be set to be maintained for the preset time CK Width from a time point delayed by the preset time CK Delay based on a transition time point of the driving signal Tx applied to the driving electrode 111a. The sampling period may be set in such a manner that values obtained by sampling the first output signals Vout1 corresponding to the nodes formed in the sensing electrode 113a have the smallest difference therebetween.

The initial sampling period may be preset by a value obtained during a test process, and periodically changed with reference to the second output signal Vout2 while the operation is performed. The start point of the sampling period and the duration of the sampling period may be set in various manners through a method of adjusting the start point, a method of adjusting the duration, and a method of adjusting the start point and the duration. The sampling period may be periodically changed according to a period set by a designer, or changed in synchronization with a signal set by a designer.

The touch sensing apparatus according to the present embodiment may set the sample period such that the values obtained by sampling the first output signals Vout1 have the smallest difference, as illustrated in FIG. 6. Thus, the touch sensing apparatus can reduce the influence of a load on the touch sensing signal Rx, thereby accurately determining the touch sensing signal Rx.

While various embodiments have been described above, it will be understood to those skilled in the art that the embodiments described are by way of example only. Accordingly, the disclosure described herein should not be limited based on the described embodiments.

What is claimed is:

1. A touch sensing apparatus comprising:
a high pass filter configured to decide a second cut-off frequency by varying the resistance of at least one of a first resistor which transfers a touch sensing signal outputted from a sensing electrode to a first amplifier and is implemented with a variable resistor and a second resistor which forms a first feedback loop for the first amplifier and is implemented with the variable resistor, and output a first output signal obtained by filtering a frequency component equal to or lower than the second cut-off frequency in the touch sensing signal, and
a low pass filter comprising a sampling switch which switches transfer of the first output signal, a third resistor which transfers the first output signal having passed through the sampling switch to a second amplifier and is implemented with the variable resistor, and a feedback capacitor which forms a second feedback loop for the second amplifier and is implemented with a variable capacitor, and configured to sample the first output signal during a sampling period, decide a third cut-off frequency by varying at least one of the resistance of the third resistor and the capacitance of the feedback capacitor, and output a second output signal obtained by filtering a frequency component equal to or higher than the third cut-off frequency in the first output signal,
wherein the sampling period is maintained for a second time from a time point delayed by a first time based on a transition time point of a driving signal applied to a driving electrode and is periodically changed with reference to the second output signal, and
wherein the time point is later than a start time of the first output signal outputted from the high pass filter.

2. The touch sensing apparatus of claim 1, wherein the high pass filter comprises:
the first amplifier having a grounded second input terminal, and configured to output the first output signal to a first output terminal;
the first resistor configured to transfer the touch sensing signal outputted from the sensing electrode to a first input terminal of the first amplifier; and
the second resistor connected between the first output terminal and the first input terminal of the first amplifier, while forming the first feedback loop,
wherein the high pass filter decides the second cut-off frequency by varying the resistance of at least one of the first and second resistors in order to adjust the width of a receive (Rx) frequency band.

3. The touch sensing apparatus of claim 1, wherein the low pass filter comprises:
the sampling switch configured to transfer the first output signal to the third resistor during the sampling period, in response to a sampling signal;
the second amplifier having a grounded fourth input terminal, and configured to output the second output signal to a second output terminal;
the third resistor configured to transfer the second output signal to a third input terminal of the second amplifier;
the feedback capacitor connected between the second output terminal and the third input terminal of the second amplifier, while forming the second feedback loop; and
a reset switch switched by a reset signal, and connected in parallel to the feedback capacitor,
wherein the low pass filter decides the third cut-off frequency by varying at least one of the resistance of the third resistor and the capacitance of the feedback capacitor in order to adjust the width of an Rx frequency band.

4. The touch sensing apparatus of claim 3, wherein the reset switch is turned on by the reset signal before a next sampling period is started, and resets the second output signal.

5. The touch sensing apparatus of claim 3, wherein the second amplifier charges the feedback capacitor by integrating the first output signal transferred through the third resistor in response to a turn-on of the sampling switch during the sampling period, and outputs the second output signal obtained by filtering a frequency component equal to or higher than the third cut-off frequency, and
as the feedback capacitor is discharged in response to a turn-on of the reset switch after sampling period, the second output signal is reset.

6. The touch sensing apparatus of claim 1, wherein the third cut-off frequency of the low pass filter is higher than the second cut-off frequency of the high pass filter.

7. The touch sensing apparatus of claim 1, wherein the sampling period is decided by a turn-on of the sampling switch which switches the transfer of the first output signal in response to a sampling signal,
the sampling switch is turned on at the time point delayed by the first time based on the transition time point of the driving signal applied to the driving electrode, and
the turn-on of the sampling switch is maintained for the second time.

8. The touch sensing apparatus of claim 1, wherein the sampling period is set in such a manner that values obtained by sampling first output signals corresponding to nodes formed in the one sensing electrode have the smallest difference therebetween.

9. A touch sensing apparatus comprising:
a differentiator configured to output a first output signal obtained by differentiating a touch sensing signal outputted from a sensing electrode, using a coupling capacitor between a driving electrode and the sensing electrode of a touch screen pad and a sheet resistor formed by the sensing electrode; and
an integrator configured to sample the first output signal during a sampling period, and output a second output signal obtained by integrating the first output signal transferred during the sampling period,
wherein the sampling period is maintained for a second time from a time point delayed by a first time based on a transition time of a driving signal applied to the driving electrode and is periodically changed with reference to the second output signal, and
wherein the time point is later than a start time of the first output signal outputted from the differentiator.

10. The touch sensing apparatus of claim 9, wherein the differentiator comprises:
the coupling capacitor between the driving electrode and the sensing electrode;
the sheet resistor formed by the sensing electrode;
a first amplifier having a grounded second input terminal, and configured to output the first output signal to a first output terminal;
a first resistor configured to transfer the touch sensing signal outputted from the sensing electrode to a first input terminal of the first amplifier, and implemented with a variable resistor; and
a second resistor connected between the first output terminal and the first input terminal of the first amplifier while forming a first feedback loop, and implemented with the variable resistor,
wherein the differentiator decides a second cut-off frequency by varying the resistance of at least one of the first and second resistors in order to adjust the width of an Rx frequency band.

11. The touch sensing apparatus of claim 9, wherein the integrator comprises:
a sampling switch configured to switch transfer of the first output signal in response to a sampling signal, during the sampling period;
a second amplifier having a grounded fourth input terminal, and configured to output the second output signal to a second output terminal;
a third resistor configured to transfer the second output signal having passed through the sampling switch to a third input terminal of the second amplifier, and implemented with a variable resistor;
a feedback capacitor connected between the second output terminal and the third input terminal of the second amplifier while forming a second feedback loop, and implemented with a variable capacitor; and a reset switch switched by a reset signal, and connected in parallel to the feedback capacitor, wherein the integrator decides a third cut-off frequency by varying at least one of the resistance of the third resistor and the capacitance of the feedback capacitor in order to adjust the width of an Rx frequency band.

12. The touch sensing apparatus of claim 11, wherein the reset switch is turned on by the reset signal before a next sampling period is started, and resets the second output signal.

13. The touch sensing apparatus of claim 11, wherein the second amplifier charges the feedback capacitor by integrating the first output signal transferred through the third resistor in response to a turn-on of the sampling switch during the sampling period, and outputs the second output signal obtained by filtering a frequency component equal to or higher than the third cut-off frequency, and as the feedback capacitor is discharged by a turn-on of the reset switch after the sampling period, the second output signal is reset.

14. The touch sensing apparatus of claim 9, wherein a third cut-off frequency of the integrator is higher than a second cut-off frequency of the differentiator.

15. The touch sensing apparatus of claim 9, wherein the sampling period is decided by a turn-on of the sampling switch which switches transfer of the first output signal in response to a sampling signal, the sampling switch is turned on at the time point delayed by the first time based on the transition time point of the driving signal applied to the driving electrode, and the turn-on of the sampling switch is maintained for the second time.

16. The touch sensing apparatus of claim 9, wherein the sampling period is set in such a manner that values obtained by sampling first output signals corresponding to nodes formed in the one sensing electrode have the smallest difference therebetween.

* * * * *